US012589563B2

(12) United States Patent
Ou et al.

(10) Patent No.: US 12,589,563 B2
(45) Date of Patent: Mar. 31, 2026

(54) COMPOSITION AND METHOD TO PROMOTE BONDING ENHANCEMENT BETWEEN A METAL AND A NON-METAL SURFACE

(71) Applicant: Halliburton Energy Services, Inc., Houston, TX (US)

(72) Inventors: Xuesong Ou, Katy, TX (US); Krutibas Panda, The Woodlands, TX (US); Alejandro Yrausquin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 70 days.

(21) Appl. No.: 18/402,967

(22) Filed: Jan. 3, 2024

(65) Prior Publication Data
US 2025/0214311 A1     Jul. 3, 2025

(51) Int. Cl.
| | |
|---|---|
| *B29C 70/68* | (2006.01) |
| *B29K 21/00* | (2006.01) |
| *B29K 705/12* | (2006.01) |
| *B29L 31/00* | (2006.01) |
| *B32B 1/00* | (2024.01) |
| *B32B 15/06* | (2006.01) |
| *E21B 4/02* | (2006.01) |

(52) U.S. Cl.
CPC .............. *B29C 70/683* (2013.01); *B32B 1/00* (2013.01); *B32B 15/06* (2013.01); *E21B 4/02* (2013.01); *B29K 2021/00* (2013.01); *B29K 2705/12* (2013.01); *B29L 2031/749* (2013.01)

(58) Field of Classification Search
CPC ......... B29C 70/683; B32B 1/00; B32B 15/06; E21B 4/02; B29K 2021/00; B29K 2705/12; B29L 2031/749
See application file for complete search history.

(56) References Cited

U.S. PATENT DOCUMENTS

| | | | |
|---|---|---|---|
| 2004/0104821 A1* | 6/2004 | Clark ................... | G01V 11/002 340/854.6 |
| 2006/0131079 A1* | 6/2006 | Bottos ................... | F04C 2/1075 175/107 |
| 2011/0070111 A1* | 3/2011 | Slay ...................... | F04C 2/1075 156/244.27 |

(Continued)

OTHER PUBLICATIONS

International Patent Application No. PCT/US2024/010117, International Search Report and Written Opinion mailed Sep. 20, 2024, 12 pages.

*Primary Examiner* — Yanick A Akaragwe
(74) *Attorney, Agent, or Firm* — Kilpatrick Townsend & Stockton LLP

(57) ABSTRACT
The present disclosure provides a composition for improving the bonding of an elastomer to a metal surface for use in wellbore operations, the composition comprising polymers, including phenolic and acrylic based polymers, one or more fillers, one or more additives, one ore more curative agents, and an epoxide promotor. The method can include single or multilayer addition to a metal surface to promote the bonding of the thermoset rubber elastomer to the metal surface. The resultant bonding can provide a good sealing performance, including at moderate or low temperature to high temperature, and exhibit good chemical compatibility and resistance when exposed to common wellbore environments.

20 Claims, 10 Drawing Sheets

(56)　　　　　References Cited

U.S. PATENT DOCUMENTS

| | | | |
|---|---|---|---|
| 2011/0116960 A1* | 5/2011 | Akbari | F04C 2/1075 418/48 |
| 2014/0170011 A1 | 6/2014 | Clouzeau et al. | |
| 2015/0017047 A1 | 1/2015 | Akbari et al. | |
| 2016/0036284 A1* | 2/2016 | Meng | E21B 4/02 524/404 |
| 2016/0186747 A1 | 6/2016 | Ramier et al. | |
| 2016/0319087 A1* | 11/2016 | Niihara | C08J 5/045 |
| 2016/0319171 A1* | 11/2016 | Fornes | C09J 163/04 |
| 2017/0254167 A1* | 9/2017 | Carbaugh | B29C 65/70 |
| 2023/0160261 A1 | 5/2023 | Kim et al. | |
| 2023/0167686 A1* | 6/2023 | Leung | C10M 109/00 175/107 |
| 2023/0313794 A1* | 10/2023 | Hondred | F04C 13/008 417/410.4 |

\* cited by examiner

COMPOSITION AND METHOD TO PROMOTE BONDING ENHANCEMENT BETWEEN A METAL AND A NON-METAL SURFACE

TECHNICAL FIELD

The present disclosure relates generally to methods to promote binding of a metal and non-metal surface for use in wellbore operations and, more particularly (although not necessarily exclusively), to polymer compositions and associated methods for use in a variety of different wellbore environments and wellbore operations.

BACKGROUND

A wide variety of elastomers are used in oil and gas applications, such as for mud motor stators, bushings, oil seals, rubber molded metallic components, or the like, to provide or improve sealing performance. In oil and gas downhole applications, stators in the mud motors must have a good bonding strength and consistency to ensure adequate performance and longevity during downhole applications. Poor bonding of a rubber to a metal surface may lead to failure and leakage of fluid, or shorter life use of the stator thus increasing costs. In downhole applications, the bonding of the metal and thermoset elastomer is impacted due to the chemical and thermal compatibility with the well conditions and fluids used in the well. To promote bonding of the thermoset rubber elastomers to the metal surface, singular or multilayer methods are employed. These methods can result in poor bonding, increased operation costs, and susceptibility to chemical and thermal attack downhole.

DETAILED DESCRIPTION

Figure 1:
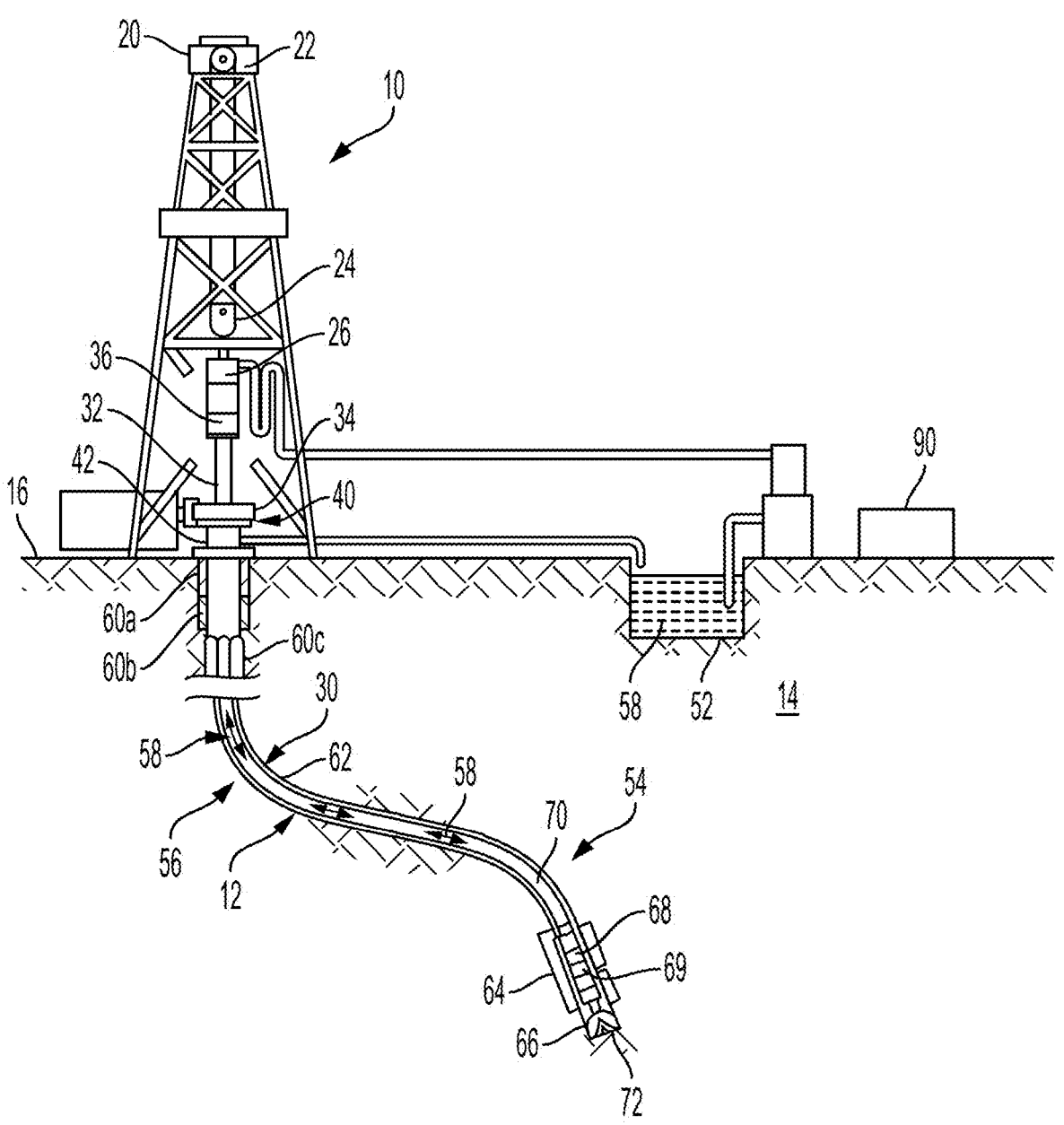
FIG. 1 is a cross-sectional view of an example of a well system according to some aspects of the present disclosure.

Certain aspects and examples of the present disclosure relate to thermoset rubber elastomer blends and adhesive compositions to promote good bonding to metal surfaces, including at high temperatures and or at moderate or high pressures (e.g., up to 5000 psi), and to exhibit good chemical compatibility and resistance when exposed to common wellbore environments. Additionally, the thermoset rubber elastomer blends and adhesive compositions are manufacturable without the use of complex processing. Example metal surfaces can include a mud motor stator, bushings, oil seals, or other metallic components found in wellbore operations.

The thermoset rubber elastomer that can provide such performance characteristics include partially fluorinated elastomers, fluorocarbon rubber elastomers, rubbers composed of acrylonitrile butadiene and polyvinyl chloride known commonly as NVR rubber elastomers, hydrogenated nitrile butadiene rubber (HNBR) rubber, and nitrile butadiene rubber (NBR) elastomers, or blends thereof. Example compositions for improving the bonding to the metal surface can include adding an epoxide promoter to the adhesive composition.

Methods and compositions commonly employed for bonding metal surface to rubber provide inadequate bonding of the metal surface to the rubber elastomer resulting in replacement of parts, increased costs, and decreases in production capability. The methods and compositions described herein may provide improved bonding strength to the metal surface capable of resisting chemical attack, high temperature environments, and improved binding under high pressure conditions. For example, the thermoset rubber elastomers such as partially fluorinated rubber elastomers, and fluorocarbon rubber elastomers contain polymer chains including fluorine, these materials are different from perfluorinated elastomers. In perfluorinated elastomers, the polymer chains are fully fluorinated, making the chains chemically inert due to the high stability of carbon-fluorine bonds. In comparison, partially fluorinated elastomers and fluorocarbon rubber elastomers have polymer chains that include some amount of carbon-hydrogen bonds, and the inclusion of such bonds can result in increased reactivity compared to perfluorinated elastomers.

For example, while partially fluorinated elastomers, like tetrafluoroethylene propylene elastomers, generally have good chemical resistance to hydrogen sulfide (H2S) and formates, such elastomers may not be compatible with aromatic hydrocarbons or diesel, and may degrade or swell in the presence of aromatic hydrocarbons or diesel, for example. This limits the ability of partially fluorinates elastomers like tetrafluoroethylene propylene elastomers to be used as thermoset rubber elastomers in a mud motor stator, for example. In some examples, tetrafluoroethylene propylene elastomers can exhibit good sealing performance at relatively high temperatures, such as greater that about 37° C. and up to 200° C. or more, but their sealing ability at relatively low temperatures, such as less that about 37° C. can be limited.

Fluorocarbon rubbers (e.g., vinylidene fluoride-based elastomer, FKM, or FEP), on the other hand, are available in a variety of grades and comprising a variety of different monomers that allow good sealing performance at low temperatures, such as less than 37 C. and even to temperatures around or below 0 C. Fluorocarbon rubber elastomers also are generally chemically resistant against aromatic fluids, but these materials are commonly vulnerable to H2S, formates, and amines, and have poor compatibility to high pH environments (e.g., pH of about 8 or greater). This limits the ability of fluorocarbon rubbers to be used for sealing purposes in some wellbore environments, such as where H2S is present in high concentrations (e.g., above 5%), or where formates, amines, or well fluids above pH 8 are present.

NVR rubber elastomers are processed using nitrile rubber and polyvinyl chlorides with interpenetrating polymer networks. The resulting NVR elastomer includes dual characteristics of both nitrile rubber and chloroprene rubber. For example, NVR rubber elastomers are generally resistant to weather, oil and fuel, and chemicals. NVR rubbers generally are resistant to tearing. For example, these materials may be chemically resistant against aromatic fluids, H2S, formates, and amines. In some embodiments, the thermoset rubber elastomer used in the methods described herein may include NVR rubber elastomers.

Other such elastomers may include HBR or hydrogenated nitrile rubber (HNBR) rubber elastomers. HNBR rubbers may be produced from conventional nitrile rubber by hydrogenation of the unsaturated bonds in the butadiene units of the polymer. The resulting HNBR rubber may have properties that are dependent upon the acrylonitrile content and the degree of hydrogenation of the butadiene copolymer. HNBR rubber elastomers may have good oil and chemical resistance when compared to nitrile rubbers and are capable of withstanding high temperatures, such as from 37° C. to 200° C. or above. HNBR rubbers have good resistance to chemicals, heat, ozone, fuels, and oils. The mechanical properties of HNBR rubber elastomers are also generally good. For example, resistance to tears, abrasions, and stretching. However, HNBR rubber elastomers may react with aromatic oils and polar organic solvents, thereby limiting their ability to be employed as sealing purposes in some wellbore environments, such as where polar organic solvents are employed. In some embodiments, the thermoset rubber elastomer may include NBR, XNBR, fluoride elastomers, ethylene propylene diene monomer (EPDM), natural rubber (NR), styrene-butadiene rubber (SBR), butadiene rubber (BR), chloroprene rubber (CR), or acrylic elastomer.

FIG. 1 is a cross-sectional view of an example of a well system 10 according to some aspects of the present disclosure. The well system 10 can include a wellbore 12 extending through various earth strata in an oil and gas formation 14 (e.g., a subterranean formation) located below the well surface 16. The wellbore 12 may be formed of a single bore or multiple bores extending into the formation 14 and disposed in any orientation. The well system 10 can include a derrick or drilling rig 20. The drilling rig 20 may include a hoisting apparatus 22, a travel block 24, and a swivel 26 for raising and lowering casing, drill pipe, coiled tubing, and other types of pipe or tubing strings or other types of conveyance vehicles, such as wireline, slickline, and the like. The wellbore 12 can include a drill string 30 that is a substantially tubular, axially-extending drill string formed of a drill pipe joints coupled together end-to-end.

The drilling rig 20 may include a kelly 32, a rotary table 34, and other equipment associated with rotation or translation of drill string 30 within the wellbore 12. For some applications, the drilling rig 20 may also include a top drive unit 36. The drilling rig 20 may be located proximate to a wellhead 40, as shown in FIG. 1, or spaced apart from the wellhead 40, such as in the case of an offshore arrangement. One or more pressure control devices 42, such as blowout preventers (BOPs) and other well equipment may also be provided at wellhead 40 or elsewhere in the well system 10. Although the well system 10 of FIG. 1 is illustrated as being a land-based drilling system, the well system 10 may be deployed offshore.

A drilling or service fluid source 52 may supply a downhole drilling fluid 58 pumped to the upper end of the drill string 30 and flowed through the drill string 30. The fluid source 52 may supply any fluid utilized in wellbore operations, including drilling fluid, drill-in fluid, acidizing fluid, liquid water, steam, or some other type of fluid.

The well system 10 may have a pipe system 56. For purposes of this disclosure, the pipe system 56 may include casing, risers, tubing, drill strings, subs, heads or any other pipes, tubes or equipment that attaches to the foregoing, such as the drill string 30, as well as the wellbore and laterals in which the pipes, casing, and strings may be deployed. In this regard, the pipe system 56 may include one or more casing strings 60 cemented in the wellbore 12, such as the surface 60a, intermediate 60b, and other casing strings 60c shown in FIG. 1. An annulus 62 is formed between the walls of sets of adjacent tubular components, such as concentric and non-concentric casing strings 60 or the exterior of drill string 30 and the inside wall of the wellbore 12 or the casing string 60c.

Where the subsurface equipment 54 is used for drilling and the conveyance vehicle is a drill string 30, the lower end of the drill string 30 may include a bottom hole assembly 64, which may carry at a distal end a drill bit 66. During drilling operations, a weight-on-bit is applied as the drill bit 66 is rotated, thereby enabling the drill bit 66 to engage the formation 14 and drill the wellbore 12 along a predetermined path toward a target zone. For purposes of this disclosure, the drill bit 66 may be rotated with a downhole motor 68 (e.g., a mud motor) within the bottom hole assembly 64 to rotate the drill bit at the bottom end of the wellbore 72. To enhance the bonding of the elastomer within the mud motor to the metal surface, a composition of an epoxide promoter, polymers, one or more fillers, one or more additives, and one or more curative agents can be applied to the inner segment of the mud motor metal surface wherein the thermoset rubber elastomer is disposed.

Figure 2A:
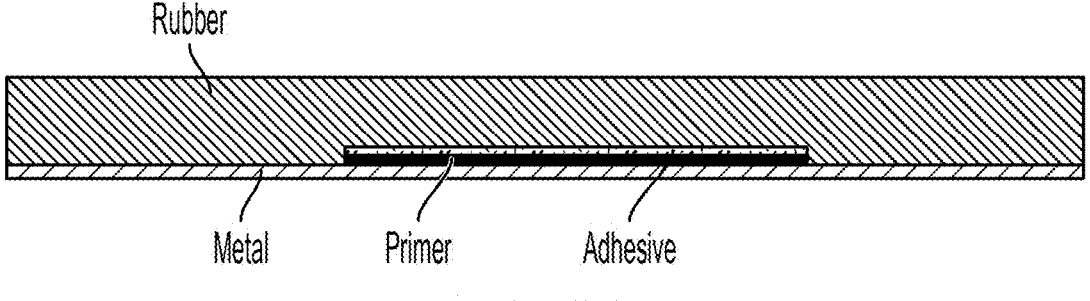
FIG. 2A is a schematic of an example of a two-layer rubber metal bonding system for use in a variety of different wellbore environments and wellbore operations, according to one example of the present disclosure.
Figure 2B:
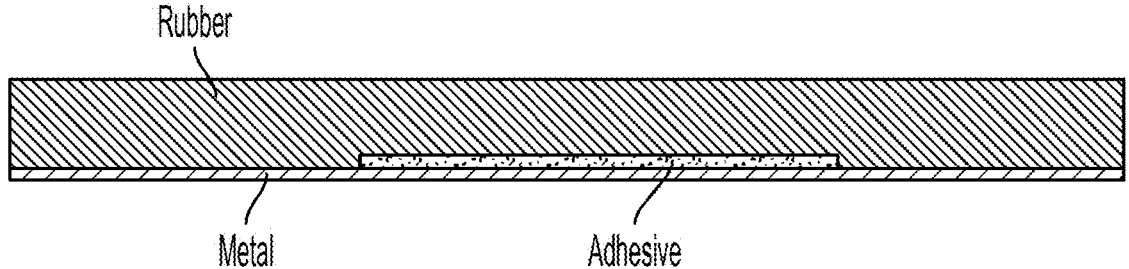
FIG. 2B is a schematic of an example of a one-layer rubber metal bonding system for use in a variety of different wellbore environments and wellbore operations, according to one example of the present disclosure.

Common methods of bonding a thermoset rubber elastomer to the surface of a metal can include a single-layer or a double layer addition of an additive or a primer such as those depicted in FIGS. 2A and 2B. For example, in a two-layer system (FIG. 2A), the metal surface is prepared for the addition of a primer to the metal surface. The primer can include phenolic based, acrylic based, or chlorinated rubber based primers. The primer is exposed to conditions to allow drying to the metal surface. For example, the primer may be exposed to ambient air for a time period sufficient to allow drying. In some embodiments, the primer is exposed to an increased temperature to reduce the drying time to the metal surface. Subsequent to the drying of the primer, an adhesive may be added to the surface of the primer. In some embodiments, the adhesive may include acrylic or phenolic based adhesives. The adhesive may then be exposed to conditions sufficient to allow adequate and complete drying of the adhesive. In some embodiments, the adhesive may be spray-coated, or brushed onto the primer-metal surface. In some embodiments, the metal surface is dipped into the adhesive solution to provide sufficient coverage of the primer surface. After sufficient time has passed to allow drying of the adhesive layer, thermoset rubber elastomer is co-molded with the metal part that includes the primer and adhesive layers.

Alternatively, in one-layer systems (FIG. 2B), the metal surface may be cleaned and prepared for the addition of an adhesive. In some embodiments, the metal surface can include, but is not limited to, a carbon steel, a stainless steel, a low alloy steel, non-magnetic austenitic stainless steel, martensitic stainless steel, precipitation hardened stainless steel, nickel based super alloys, cobalt based alloys, or inconel. The adhesive layer may then be applied to the clean metal surface. In some embodiments, the adhesive may be spray-coated, or brushed onto the primer-metal surface. In some embodiments, the metal surface is dipped into the adhesive solution to provide sufficient coverage of the metal surface. After sufficient time has passed to allow drying of the adhesive layer, thermoset rubber elastomer is co-molded with the metal part that includes the primer and adhesive layers.

Figure 3:
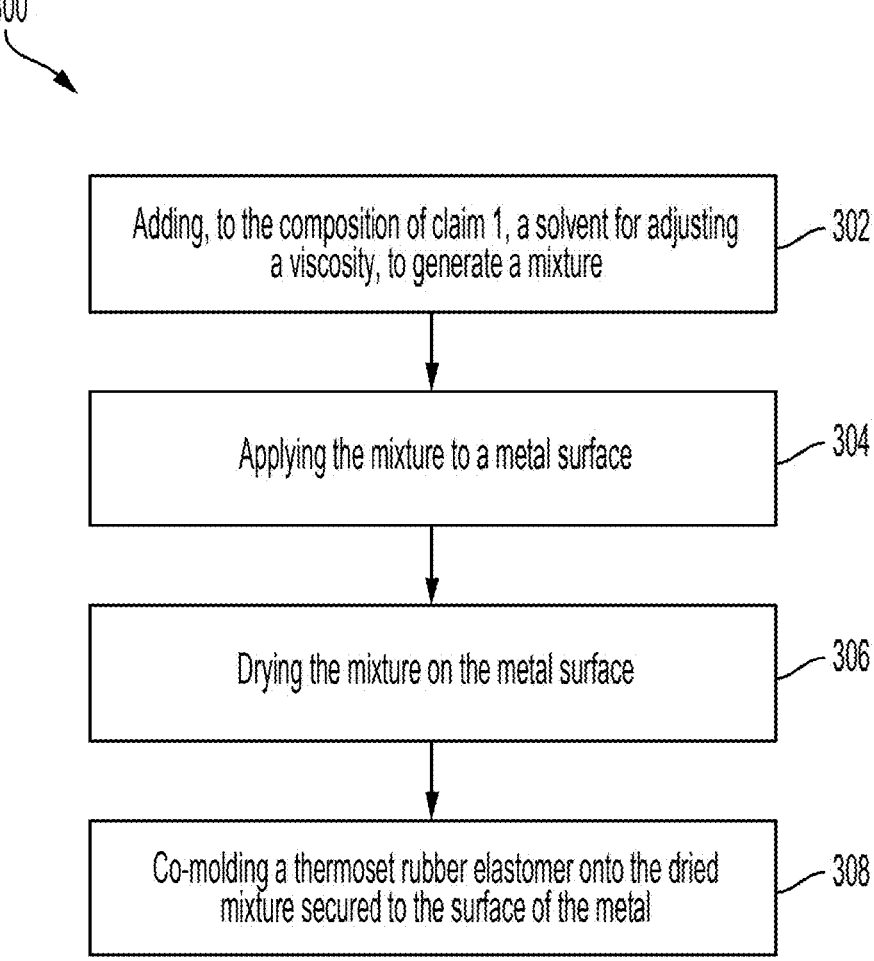
FIG. 3 is a flowchart of a process for improving the bonding of a metal surface to a non-metal surface according to one example of the present disclosure.

FIG. 3 is a flowchart of a process 300 for improving the bonding of a metal surface to a non-metal surface according to one example of the present disclosure. At block 302 a solvent for adjusting the viscosity, is added to a composition including polymers, one or more fillers and an epoxide promotor. In some embodiments, the polymers can include phenolic or acrylic based polymers. In some embodiments, the solvent used to adjust the solvent may include any known solvents to those skilled in the art. Not by way of limiting, but merely as an example, the solvent may be methyl ethyl ketone, xylene, toluene, or acetone. Optionally, adjusting the composition of claim 1 may include adding one or more filler, one or more additives, or one or more curative agents. In some embodiments, the one or more fillers can include carbon black or mineral powders. In some embodiments, the one or more additives can include tacki-fiers, plasticizers, antioxidants, flame retardants, pigments, preservatives, and moisturizers. In some embodiments, the one or more curative agents can include ethylenediamine, diethylenetriamine, triethylenetetramine, tetraethylenepen-tamine, and several types of cycloaliphatic amines. The epoxide promoter may be added to the composition to improve the binding of the thermoset rubber elastomer to the metal surface. For example, the epoxide promoter may include any epoxide that has a functionality of greater than 1. For example, the epoxide promoter may be a difunctional, trifunctional, or have a higher functionality (e.g., tetra-functional or pentafunctional). For example, a difunctional epoxide can include, but are not limited to, bisphenol A diglycidylether, bisphenol F diglycidylether, 1,4 butandiol diglycidylether, neopentyldiglycidylether, and 1,6-hexan-diol diglycidylether. A trifunctional epoxy can include, but is not limited to, an aminophenol triglycidyl ether or any suitable para-aminophenol. In some embodiments, a tetra-functional epoxy resin can include, but is not limited to, N,N, N,N'-tetraglycidyl-4,4'-diaminodiphenyl ether. In some examples, the epoxide promoter may be any epoxy, such as epoxy resins, also known as polyepoxides. In some embodiments, the epoxide promoter may be a pure epoxy, polyester resin, or an epoxy acrylate. Polyepoxides are a class of reactive prepolymers and polymers which contain epoxide groups. The epoxide functional groups may also be referred to as oxirane. In some embodiments, the epoxy resin may be reacted (cross-linked) either with themselves through catalytic homopolymerization, or with the phenolic or acrylic polymers as described above. In some embodiments, the epoxy resin may react with themselves. In some embodiments, the epoxide promoter may further increase the chemical resistance of the thermoset rubber elastomers as described above. The epoxy resin may further improve other characteristics, such as the thermal resistance and their resistance to pH changes. In some embodiments, the epoxide promoter may include aliphatic epoxy resins, cycloaliphatic epoxy resins, bisphenol epoxy resins, novolac epoxy resins, or glycidylamine epoxy resins. In some embodiments, the epoxide promoter may include glycidylester epoxy resins, glycidylether epoxy resins. In some embodiments, the epox-ide promoter may include a one-part epoxy resin or a two-part epoxy resin. In some embodiments, the epoxy resin may be any known epoxy to those skilled in the art that has a functionality greater than one.

The epoxide promoter may be included in an amount of from 0.25 wt. % to 5 wt. % by weight of the solid content in the composition. For example, the epoxide promoter may be present in an amount from about 0.25 wt. % to about 1.0 wt. %, from about 1.0 wt. % to about 1.25 wt. %, from about 1.25 wt. % to about 1.50 wt. %, from about 1.50 wt. % to about 1.75 wt. %, from about 1.75 wt. % to about 2.00 wt. %, from about 2.0 wt. % to about 2.25 wt. %, from about 2.25 wt. % to about 2.50 wt. %, from about 2.50 wt. % to about 2.75 wt. %, from about 2.75 wt. % to about 3.00 wt. %, from about 3.0 wt. % to about 3.25 wt. %, from about 3.25 wt. % to about 3.50 wt. %, from about 3.50 wt. % to about 3.75 wt. %, from about 3.75 wt. % to about 4.00 wt. %, from about 4.0 wt. % to about 4.25 wt. %, from about 4.25 wt. % to about 4.50 wt. %, from about 4.50 wt. % to about 4.75 wt. %, or from about 4.75 wt. % to about 5.00 wt. %, by weight of the solid content in the composition.

At block 304 the mixture is added to a metal surface. Prior to the adding of the mixture to the metal surface, the metal surface may optionally be cleaned in preparation for the addition of the mixture. In some embodiments, the metal surface may include a carbon steel, a stainless steel, a low alloy steel, non-magnetic austenitic stainless steel, marten-sitic stainless steel, precipitation hardened stainless steel, nickel based super alloys, cobalt based alloys, Inconel, or other suitable metal used in wellbore operations. Subsequent to cleaning the metal surface, the method may optionally include adding a primer to the metal surface. The primer may be exposed to conditions sufficient to allow adequate drying to the metal surface. The mixture may be exposed to conditions adequate to allow sufficient drying to the metal surface. In some embodiments, the mixture may be added to the dried primer.

Upon addition of the mixture, the surface may be exposed to conditions to allow sufficient drying of the mixture to the metal surface, 306. For example, the mixture may be exposed to ambient air for a duration from about 10 minutes to about 1 hour. For example, from 10 minutes to 20 minutes, from 20 minutes to 30 minutes, from 30 minutes to 40 minutes, from 40 minutes to 50 minutes, or from 50 minutes to 1 hour. In some embodiments, the metal surface and mixture may be pre-treated at temperatures of from 35° C. to 160° C. to decrease the drying time. For example, pre-treating temperature may be from about 35° C. to 85° C., from 85° C. to 135° C., or from 135° C. to 160° C. In some embodiments, ambient temperature may refer to a tempera-ture of between 15° C. to 25° C. In some embodiments, ambient temperature may refer to an environment's actual air temperature as measured by a thermometer. For example, ambient temperature in an environment closer to the earth's equator may be higher than ambient temperature in an environment further from the earth's equator.

At block 308, co-molding of a thermoset rubber elastomer onto the dried mixture secured to the surface of the metal is performed. Upon sufficient drying of the one-layer or two-layer adhesive and or primer including the epoxide promoter, the thermoset rubber elastomer may be co-molded to the metal surface. In some embodiments, the co-molding may include over molding, injection molding, compression molding, transfer molding, or complete encapsulation. For example, in over molding, the thermoset rubber elastomer is molded over the metal surface. In some embodiments, the over molding process may include multi-layer addition of the thermoset rubber elastomer. Transfer molding is a process of inserting the metal parts into a mold that may be heated. The thermoset rubber elastomer is the pushed into the mold using a heated plunger to fill around the metal part. Upon compression, the mold is then cured and vulcanized at high pressure and temperature to complete the co-molding. In some embodiments, the co-molding may produce a metal surface bonded to a thermoset rubber elastomer capable of withstanding high pressures, high temperatures, and chemically inert to common downhole fluids in wellbore operations.

During co-molding, the method may further include activation of the polymers, one or more fillers, one or more additives, one or more curative agents, and the epoxide promoter. In some embodiments, the activation of the mixture may include heating the mixture to a temperature from 90° C. to 110° C. The temperature may be held for a time period sufficient to allow complete activation of the mixture. For example, the temperature may be held for a time period from 10 minutes to 1 hour (e.g., from 10 minutes to 20 minutes, from 20 minutes to 30 minutes, from 30 minutes to 40 minutes, from 40 minutes to 50 minutes, or from 50 minutes to 1 hour).

Subsequent to activation of the mixture, the thermoset rubber elastomer may be extruded onto the mixture and metal surface via over molding, injection molding, compression molding, transfer molding, or complete encapsulation. The thermoset rubber extruded may be cured on the surface of the metal. Curing of the thermoset rubber elastomer may also be referred to as vulcanization. The process of curing may allow the long polymer chains to crosslink, thus preventing the chains to move independently, allowing the thermoset rubber elastomer to withstand stretching, tearing, and compression. In some embodiments, the curing of the thermoset rubber elastomer may include heating the thermoset rubber elastomer positioned on the metal surface at a temperature from about 150° C. to about 170° C. The time required to cure the thermoset rubber elastomer may be dependent upon the thermoset rubber elastomer thickness disposed on the metal surface. In some embodiments, curing at a temperature of from about 150° C. to about 170° C. may include from 3 hours to 6 hours. For example, from about 3 hours to 4 hours, from about 4 hours to about 5 hours or from about 5 hours to about 6 hours.

In some embodiments, the thermoset rubber elastomer co-molded to the metal surface may be capable of withstanding a pressure greater than 650 pound per square inch (PSI) as measured by a balloon test. The balloon test may be a method of measuring the binding strength of a metal surface to a non-metal surface, for example, a metal surface to a thermoset rubber elastomer. The balloon test may include introducing a hole into the metal surface deep enough to reach the interface of the binding of the metal surface to the thermoset rubber elastomer. Once the hole is drilled, fluid is injected into the hole at high pressures. The high-pressure fluid injection into the hole may generate a balloon (or fluid pocket) at the rubber-metal surface if binding of the metal to the thermoset rubber is insufficient. The fluid pressure may be continuously increased until a balloon is formed at which the test is considered a failure. Additional test failures include fluid ejecting from the rubber-metal interface. An example of the balloon test may be seen in FIG. 9. In some embodiments, the rubber-metal interface described herein may be capable of withstanding pressures greater than 650 PSI. For example, the rubber-metal interface may be capable of withstanding greater than 650 PSI, greater than about 675 PSI, greater than about 700 PSI, greater than about 725 PSI, greater than about 750 PSI, greater than about 775 PSI, or greater than 800 PSI.

In some embodiments, the thermoset rubber elastomer co-molded to the metal surface may include a peel test of greater than 70% coverage as measured by the ASTM-D-429B test. During ASTM-D-429B testing adhesive may be referred to as a cement. In the ASTM-D-429B test, there are 4 types of failure when the rubber is peeled off the metal surface. For example, there can be a failure in rubber body, failure in rubber cover cement interface, failure in cover cement-primer interface, or failure in metal-primer interface. In some embodiments, the methods and compositions described herein may include a peel test of greater than 71% coverage, greater than 72% coverage, greater than 73% coverage, greater than 74% coverage, greater than 75% coverage, greater than 76% coverage, greater than 77% coverage, greater than 78% coverage, greater than 79% coverage, greater than 80% coverage, greater than 81% coverage, greater than 82% coverage, greater than 83% coverage, greater than 84% coverage, greater than 85% coverage, greater than 86% coverage, greater than 87% coverage, greater than 88% coverage, greater than 89% coverage, or greater than 90% coverage as measured by the ASTM-D-429B test.

Example 1

To test the improved bonding of a thermoset rubber elastomer to a metal surface, three rubber compounds were tested (EXP4, HAL-C3, and C5B). To compare the compounds via the methods described herein, control samples were prepared via applying adhesive and primer to the metal surface. The layers were allowed to dry and one of the thermoset rubber elastomers (herein referred to as HAL-C3, EXP4, and C5B) was co-molded to the metal surface. The test samples were prepared in a similar fashion to the control samples, the difference being, the test samples included the use of the epoxide promoter. HAL-C3, EXP4, and C5B are all different types of NBR rubbers and were used to demonstrate that the epoxide promoter can improve the bonding of the thermoset rubber elastomer to the metal surface independent of the type of rubber used.

Figure 4B:
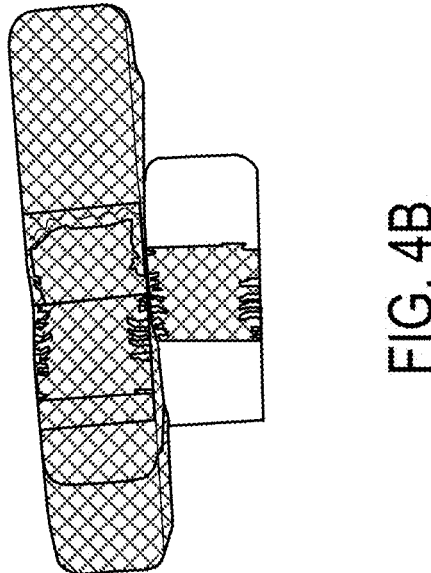
FIGS. 4A and 4B depict a top-down view of a peel test of a metal surface bonded to a non-metal surface without chemical attack or heat aging of a rubber composition, according to one example of the present disclosure.
Figure 4A:
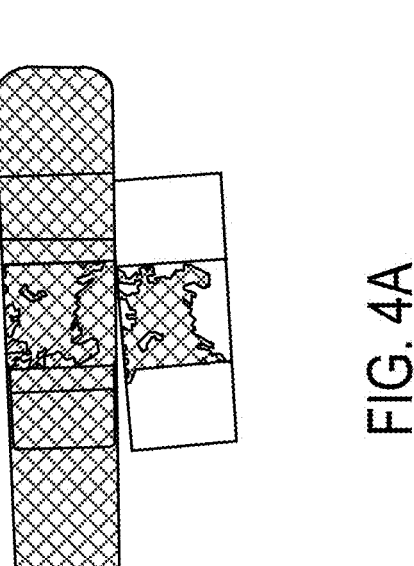

FIGS. 4A and 4B depict a top-down view of a peel test of a metal surface bonded to a non-metal surface without chemical attack or heat aging of the EXP4, according to one example of the present disclosure. As can be seen from the figure, after the ASTM-D-429B peel test, the control sample of FIG. 4A had roughly 60% coverage on the metal surface. The test with epoxide promoter of FIG. 4B had a coverage of roughly 90% rubber coverage on the metal surface following the peel test. The results demonstrate that under test conditions without chemical attack or heat aging, the epoxide promoter composition included within the mixture may improve the binding of the non-metal surface to the metal surface.

Figure 5A:
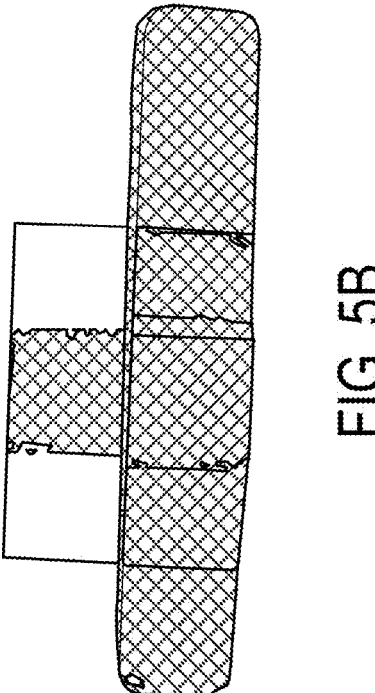
FIGS. 5A and 5B depict a top-down view of a peel test of a metal surface bonded to a non-metal surface without chemical attack or heat aging of an additional rubber composition, according to one example of the present disclosure.
Figure 5B:
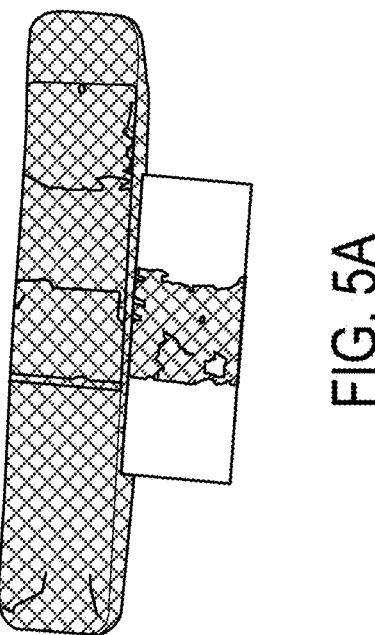

FIGS. 5A and 5B depict a top-down view of a peel test of a metal surface bonded to a non-metal surface without chemical attack or heat aging of HAL-C3, according to one example of the present disclosure. The results in FIGS. 5A and 5B demonstrate that the thermoset rubber elastomer composition co-molded on the metal surface may not impact the increased binding of the metal to a non-metal surface and the binding increase may be related to the improved composition as described herein. For example, the epoxide promoter of FIG. 5B had an almost 100% coverage of the metal surface when the binding promoter was used, while the control sample of FIG. 5A had roughly an 80% coverage under the same conditions.

Figure 6B:
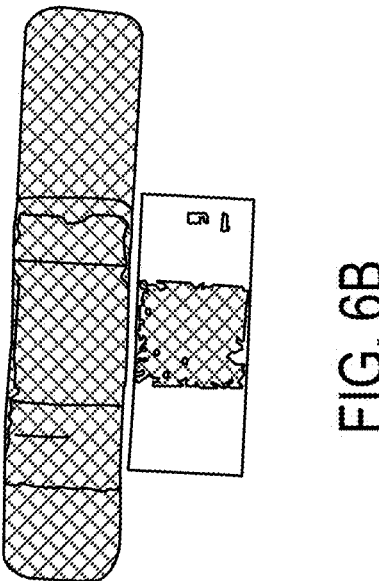
FIGS. 6A and 6B depict a top-down view of a peel test of a non-metal surface bonded to a metal surface without chemical attack or heat aging of an additional rubber composition, according to one example of the present disclosure.
Figure 6A:
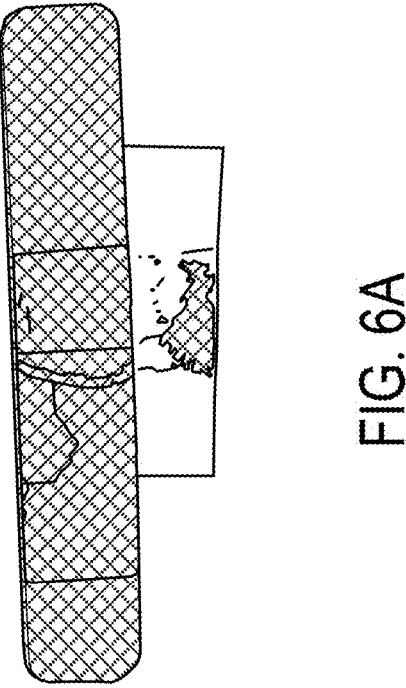

FIGS. 6A and 6B depict a top-down view of a peel test of a non-metal surface bonded to a metal surface without chemical attack or heat aging of C5B rubber, according to one example of the present disclosure. Test samples, herein referred to as C5B, were prepared in a similar manner to the EXP4 and HAL-C3 test samples. Co-molding of the thermoset rubber elastomer (C5B) to the metal surface was allowed to dry and the peel test was performed. The control sample of FIG. 6A resulted in an area coverage of 20%. The sample prepared with the epoxide promoter of FIG. 6B resulted in an area coverage over 80%. The results demonstrate the methods and composition described above result in an improved binding strength of the metal surface to the non-metal surface.

Example 2

EXP4 and HAL-C3 were prepared in a similar manner as above. The control samples were prepared in a similar manner to the test samples with epoxide promoter, however, no epoxide promoter was used for the control samples. For example, EXP4 rubber was co-molded to the metal surface (control) and EXP4 rubber was co-molded to the metal surface with epoxide promoter (test sample). The peel test was performed following sample submersion in a brine solution held at 350° F. for 72 hours for both the control, and the test samples. These conditions were chosen to mimic potential downhole conditions and test the binding strength of the methods and compositions described herein. For example, downhole conditions are often at elevated temperatures such as at or above 350° F. and common solutions used in wellbore operations include the injection of brine into the subterranean formations.

Figure 7B:
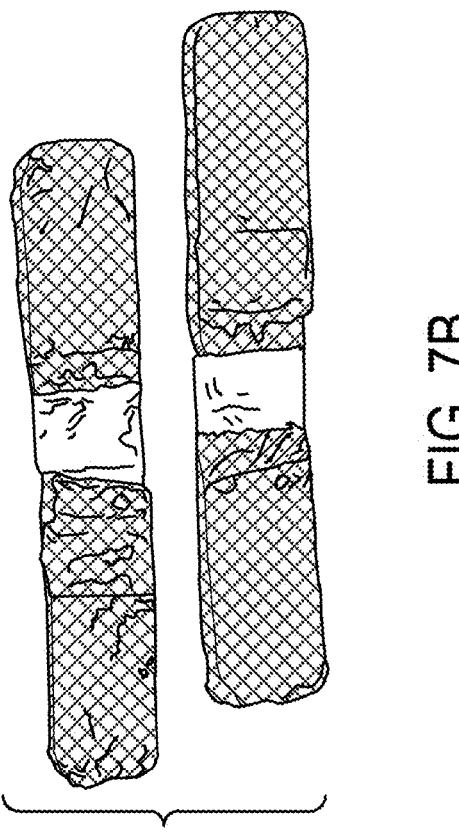
FIGS. 7A and 7B depict a top-down view of a peel test of a rubber elastomer bonded to a metal surface after 72-hour immersion in brine fluid at 350° F., according to one example of the present disclosure.
Figure 7A:
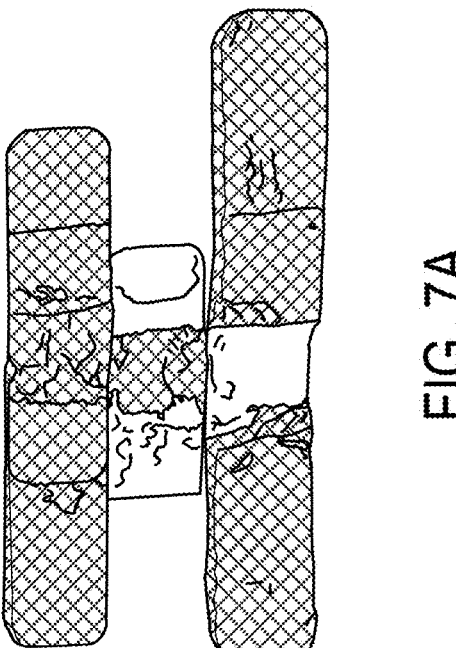

FIGS. 7A and 7B depict a top-down view of a peel test of EXP4 rubber elastomer bonded to a metal surface after 72-hour immersion in brine fluid at 350° F., according to one example of the present disclosure. As the samples are aged, the EXP4 rubber body tended to break faster than in the non-heat-treated sample. For example, in the control sample of FIG. 7A one of the samples failed via breakage of the EXP4 rubber tab, while the second control sample had about 80% rubber coverage after the peel test. The epoxide promoter of FIG. 7B resulted in both samples breaking in the EXP4 rubber tab. The breakage of the rubber tab signifies that the EXP4 rubber tab failed before the rubber was separated from the metal surface. The results demonstrate that the epoxide promoter, when added to the composition of the adhesive prior to co-molding, is capable of withstanding increased temperatures and chemical attack.

Figure 8B:
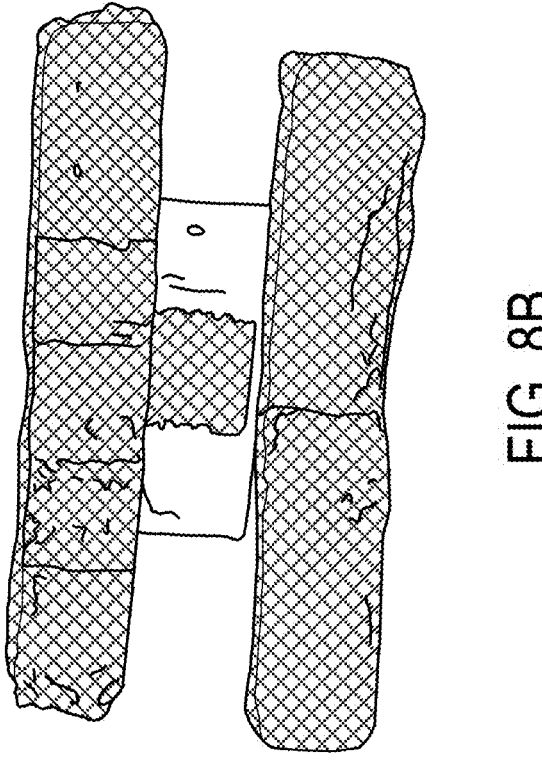
FIGS. 8A and 8B depict a top-down view of a peel test of a rubber elastomer bonded to a metal surface after 72-hour immersion in brine fluid at 350° F., according to one example of the present disclosure.
Figure 8A:
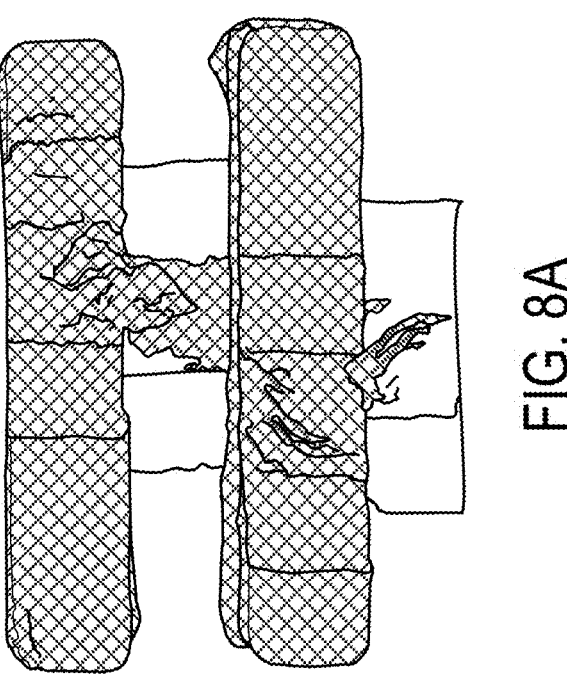

FIGS. 8A and 8B depict a top-down view of a peel test of HAL-C3 rubber elastomer bonded to a metal surface after 72-hour immersion in brine fluid at 350° F., according to one example of the present disclosure. The control samples (HAL-C3 without epoxide promoter) of FIG. 8A resulted in an area coverage of about 20% and 80% after the peel test. The epoxide promoter samples of FIG. 8B resulted in one HAL-C3 rubber tab breaking and one with an area coverage of about 90% after the peel test. The results demonstrate that the change in rubber composition does not impact the effect the epoxide promoter has on the binding strength of the metal to non-metal surface.

Example 3

For mud motor stator applications, a test is often employed to measure the binding strength of a metal surface to a no-metal surface such as the thermoset rubber elastomer. The balloon test was performed on a section of a mud motor stator from injection molded parts. The balloon test may include introducing a hole into the metal surface deep enough to reach the interface of the binding of the metal surface to the thermoset rubber elastomer. Once the hole is drilled, water is injected into the hole at high pressures. The high-pressure water injection into the hole may generate a balloon (or water pocket) at the rubber-metal surface if binding of the metal to the thermoset rubber is insufficient. The water pressure may be continuously increased until a balloon is formed at which the test is considered a failure. Additional test failures include water ejecting from the rubber-metal interface.

Figures 9A, 9B, 9C, 9D:
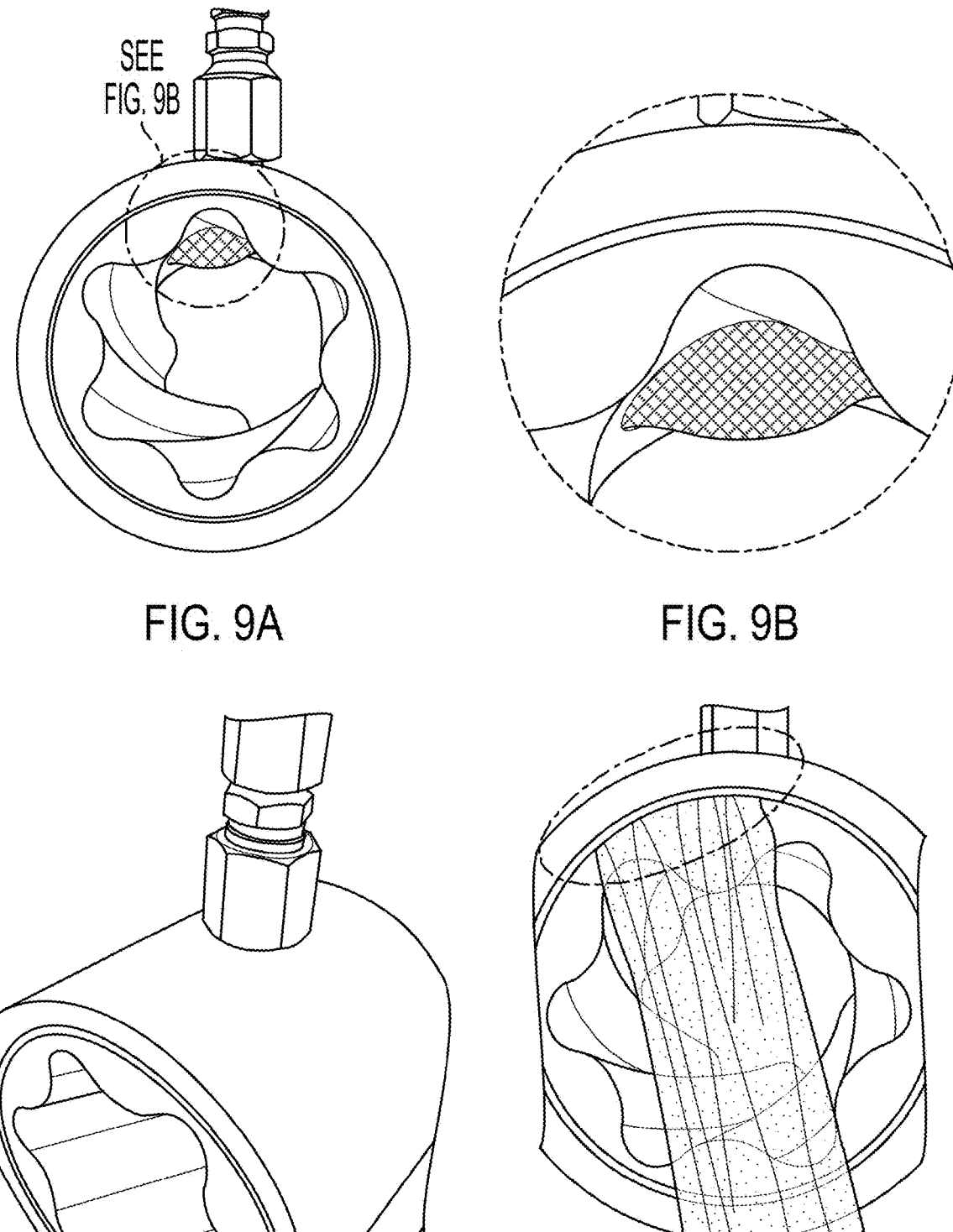
FIGS. 9A-9D depict cross-sectional views of a stator in a balloon test for assessing the break point of a non-metal surface bonded to a metal surface, according to one example of the present disclosure.

FIGS. 9A-9D depict cross-sectional views of a stator in a balloon test for assessing the break point of a non-metal surface bonded to a metal surface, according to one example of the present disclosure. The stator component was subsequently exposed to an initial water pressure at the injection site and a balloon may be seen forming in the rubber of FIG. 9A. The balloon forms when the pressure from the water tears the rubber from the metal surface or there is a failure in the binding of the rubber to the metal surface. The metal injection site shown in FIG. 9B is the location where the pressure is added to the rubber-metal interface to the stator component. The pressure was increased until a failure was seen in the rubber metal interface as seen in FIG. 9C. Upon increased pressure at the rubber metal interface, a section of the rubber failed to stay adequately bound to the metal surface, resulting in a leakage of water at the junction site (circled in FIG. 9D).

Figures 10A, 10B:
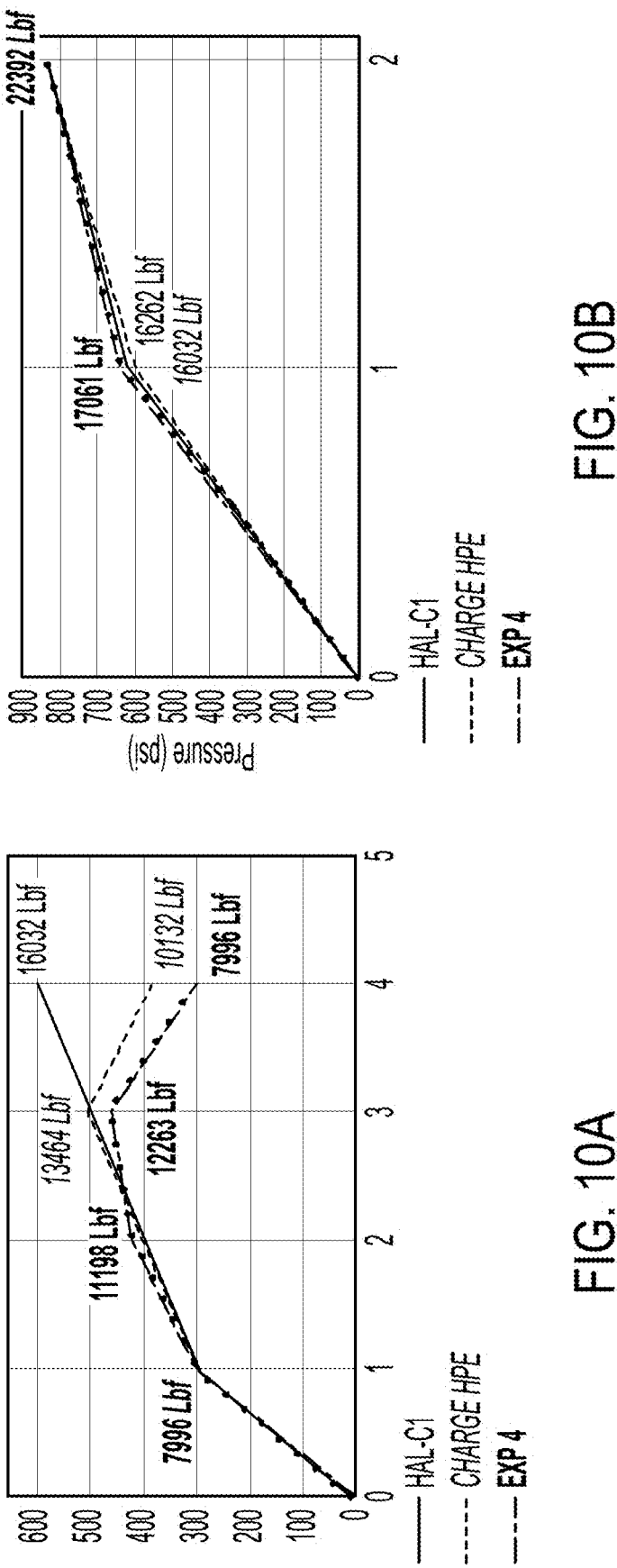
FIGS. 10A and 10B depict graphs of a control sample for the pressure vs time of samples undergoing a balloon test and of the binding enhancement of the metal surface, according to one example of the present disclosure.

FIGS. 10A and 10B depict a graph of a control sample for the pressure vs time of samples undergoing a balloon test, and a graph of the binding enhancement of the metal and non-metal surface, according to one example of the present disclosure. Sample controls (A) of HAL-C1 (Solid line), CHARGE HPE (Dashed line), and EXP4 (dotted line) were prepared in mud motor stator segments, each control sample having no epoxide promoter. The control samples were then tested under the balloon testing methods. The initial pressure of 7669 pound force (lbf) resulted in no failure in the control samples. EXP4 under 11198 lbf resulted in failure in the failure of the stator component. At 13646 lbf, the CHARGE HPE control sample failed, resulting in a pressure loss seen in FIG. 10A. The control sample of HAL-C1 demonstrated the highest lbf at 16032 before testing was ended. The samples were then prepared with the epoxide promoter to demonstrate the methods and compositions described herein may improve the binding strength of the metal to the non-metal surface. HAL-C1, CHARGE HPE, and EXP4 samples prepared with the improved methods and compositions were put under 16262 lbf, 16032 lbf, and 17061 lbf respectively without failure in interface of the metal and rubber. The samples were subsequently exposed to 222392 lbf and no failure was observed in the samples as observed in FIG. 10B. The results demonstrate that the methods and compositions described herein are capable of improving the binding strength of the different thermoset rubber elastomer to the metal surface.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

In some aspects, compositions, methods, and systems for improving the binding strength of a metal surface to a thermoset rubber elastomer are provided according to one or more of the following examples:

Example 1 is a system comprising: a downhole tool, wherein the downhole tool comprises: a metallic surface; an adhesive layer positionable on the metallic surface; an epoxide promoter layer positionable on the adhesive layer; and a thermoset rubber elastomer extruded onto the epoxide promoter layer, wherein the adhesive and the epoxide promoter enhance a bonding of the metallic surface to the thermoset rubber elastomer.

Example 2 is the system of example 1, wherein the downhole tool comprises a mud motor.

Example 3 is the system of any of examples 1-2, wherein the metal surface comprises a stator portion of a mud motor.

Example 4 is the system of any of examples 1-4, wherein the epoxide promoter layer is present in an amount of from 0.25 wt. % to 5 wt. % by weight of the solid content in the composition.

Example 5 is the system of any of examples 1-4, wherein the epoxide promoter layer comprises a difunctional, a trifunctional, or a tetrafunctional epoxy.

Example 6 is the system of any of examples 1-5, wherein the adhesive layer and epoxide layer further comprises a solvent for adjusting a viscosity of the composition, wherein the solvent comprises methyl ethyl ketone, xylene, toluene, acetone, or any combination thereof.

Example 7 is the system of any of examples 1-6, wherein the thermoset rubber elastomer comprises a partially fluorinated elastomers, a fluorocarbon rubber elastomers, NVR elastomer, HNBR elastomer, HBR elastomer, NBR, XNBR, fluoride elastomers, EPDM, NR, SBR, BR, CR, acrylic elastomer, or a combination of two or more thermoset rubber elastomers to produce a blend.

Example 8 is the system of any of examples 1-7, wherein the metallic surface comprises a carbon steel, a stainless steel, a low alloy steel, non-magnetic austenitic stainless steel, martensitic stainless steel, precipitation hardened stainless steel, nickel based super alloys, or cobalt based alloys.

Example 9 is a composition for improving the binding of an elastomer to a metal surface for use in wellbore operations, the composition comprising: one or more polymer, wherein the one or more polymer is a phenolic or acrylic based polymer; one or more fillers; and an epoxide promoter, wherein the epoxide promoter, polymers, and one or more fillers improve the binding of an elastomer to the metal surface.

Example 10 is the composition of example 9, wherein the epoxide promoter is present in an amount of from 0.25 wt. % to 5 wt. % by weight of the solid content in the composition.

Example 11 is the composition of any of examples 9-10, wherein the epoxide promoter comprises a difunctional, a trifunctional, or a tetrafunctional epoxy.

Example 12 is the composition of any of examples 9-11, wherein the metal surface comprises a carbon steel, a stainless steel, a low alloy steel, non-magnetic austenitic stainless steel, martensitic stainless steel, precipitation hardened stainless steel, nickel based super alloys, or cobalt based alloys.

Example 13 is a method for binding a thermoset rubber elastomer composition to a metal surface for use in wellbore operations, the method comprising: adding, to the composition of claim 9, a solvent, for adjusting a viscosity, to generate a mixture; applying the mixture to a metal surface; drying the mixture on the metal surface; and co-molding a thermoset rubber elastomer onto the dried mixture secured to the surface of the metal.

Example 14 is the method of example 13, wherein the thermoset rubber elastomer comprises a partially fluorinated elastomers, a fluorocarbon rubber elastomers, NVR elastomer, HNBR elastomer, HBR elastomer, NBR, XNBR, fluoride elastomers, EPDM, NR, SBR, BR, CR, acrylic elastomer, or a combination of two or more thermoset rubber elastomers to produce a blend.

Example 15 is the method of any of examples 13-14, further comprising curing the thermoset rubber elastomer at a temperature of from 150° C. to 170° C. for from 3 hours to 6 hours.

Example 16 is the method of any of examples 13-15, wherein drying the mixture to the metal surface comprises drying at ambient temperature or pre-treating at a temperature of from 35° C. to 160° C.

Example 17 is the method of any of examples 13-16, further comprising adding a primer subsequent to drying the mixture on the metal surface, wherein the primer comprises a phenolic based primer, an acrylic based primer, or a chlorinated rubber based primer.

Example 18 is the method of any of examples 13-17, wherein the co-molding comprises a peel test result of greater than 70% coverage as measured by an ASTM D 429B test.

Example 19 is the method of any of examples 13-18, wherein the metal surface comprises a carbon steel, a stainless steel, a low alloy steel, non-magnetic austenitic stainless steel, martensitic stainless steel, precipitation hardened stainless steel, nickel based super alloys, or cobalt based alloys.

Example 20 is the method of any of examples 13-19, wherein the co-molding comprises injection molding, over-molding, complete encapsulation, transfer molding, or compression molding.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A system comprising:
  a downhole tool, wherein the downhole tool comprises:
    a metallic surface;
    an adhesive positionable on the metallic surface;

an epoxide promoter positionable on the adhesive; and a thermoset rubber elastomer co-molded with the epoxide promoter onto the metallic surface, wherein the adhesive and the epoxide promoter enhance a bonding of the metallic surface to the thermoset rubber elastomer.

2. The system of claim 1, wherein the downhole tool comprises a mud motor.

3. The system of claim 1, wherein the metal surface comprises a stator portion of a mud motor.

4. The system of claim 1, wherein the epoxide promoter is present in an amount of from 0.25 wt. % to 5 wt. % by weight of a solid content in a composition, wherein the composition comprises the adhesive and the epoxide promoter.

5. The system of claim 1, wherein the epoxide promoter comprises a difunctional, a trifunctional, or a tetrafunctional epoxy.

6. The system of claim 1, wherein the adhesive and the epoxide promoter together form a composition, wherein the composition further comprises a solvent for adjusting a viscosity of the composition comprising the adhesive and the epoxide promoter, wherein the solvent comprises methyl ethyl ketone, xylene, toluene, acetone, or any combination thereof.

7. The system of claim 1, wherein the thermoset rubber elastomer comprises a partially fluorinated elastomers, a fluorocarbon rubber elastomers, NVR elastomer, HNBR elastomer, HBR elastomer, NBR, XNBR, fluoride elastomers, EPDM, NR, SBR, BR, CR, acrylic elastomer, or a combination of two or more thermoset rubber elastomers to produce a blend.

8. The system of claim 1, wherein the metallic surface comprises a carbon steel, a stainless steel, a low alloy steel, non-magnetic austenitic stainless steel, martensitic stainless steel, precipitation hardened stainless steel, nickel based super alloys or cobalt based alloys.

9. A composition for improving a binding of an elastomer to a metal surface for use in wellbore operations, the composition comprising:

one or more polymer, wherein the one or more polymer is a phenolic or acrylic based polymer;

one or more filler; and an epoxide promoter, wherein the epoxide promoter, polymers, and one or more fillers are co-moldable with a thermoset rubber elastomer, and wherein the epoxide promoter, polymers, and one or more fillers are adherable to the metal surface to improve the binding of the thermoset rubber elastomer to the metal surface.

10. The composition of claim 9, wherein the epoxide promoter is present in an amount of from 0.25 wt. % to 5 wt. % by weight of the solid content in the composition.

11. The composition of claim 9, wherein the epoxide promoter comprises a difunctional, a trifunctional, or a tetrafunctional epoxy.

12. The composition of claim 9, wherein the metal surface comprises a carbon steel, a stainless steel, a low alloy steel, non-magnetic austenitic stainless steel, martensitic stainless steel, precipitation hardened stainless steel, nickel based super alloys or cobalt based alloys.

13. A method for binding a thermoset rubber elastomer composition to a metal surface for use in wellbore operations, the method comprising:

adding a solvent, for adjusting a viscosity, to a composition to generate a mixture, the composition comprising:

one or more polymer, wherein the one or more polymer is a phenolic or acrylic based polymer;

one or more filler; and an epoxide promoter;

applying the mixture to a metal surface;

drying the mixture on the metal surface; and co-molding a thermoset rubber elastomer onto the dried mixture secured to the surface of the metal.

14. The method of claim 13, wherein the thermoset rubber elastomer comprises a partially fluorinated elastomers, a fluorocarbon rubber elastomers, NVR elastomer, HNBR elastomer, HBR elastomer, NBR, XNBR, fluoride elastomers, EPDM, NR, SBR, BR, CR, acrylic elastomer, or a combination of two or more thermoset rubber elastomers to produce a blend.

15. The method of claim 13, further comprising curing the thermoset rubber elastomer at a temperature of from 150° C. to 170° C. for from 3 hours to 6 hours.

16. The method of claim 13, wherein drying the mixture to the metal surface comprises drying at ambient temperature or pre-treating at a temperature of from 35° C. to 160° C.

17. The method of claim 13, further comprising adding a primer subsequent to drying the mixture on the metal surface, wherein the primer comprises a phenolic based primer, an acrylic based primer, or a chlorinated rubber based primer.

18. The method of claim 13, wherein the co-molding comprises a peel test result of greater than 70% coverage as measured by an ASTM D 429B test.

19. The method of claim 13, wherein the metal surface comprises a carbon steel, a stainless steel, a low alloy steel, non-magnetic austenitic stainless steel, martensitic stainless steel, precipitation hardened stainless steel, nickel based super alloys or cobalt based alloys.

20. The method of claim 13, wherein the co-molding comprises injection molding, over-molding, complete encapsulation, transfer molding, or compression molding.

* * * * *